May 19, 1953 G. B. R. FEILDEN 2,638,743
CONSTRUCTION OF TURBINE-INLET AND
STATOR ELEMENTS OF GAS TURBINES
Filed April 26, 1950 4 Sheets-Sheet 4
FIG. 6.
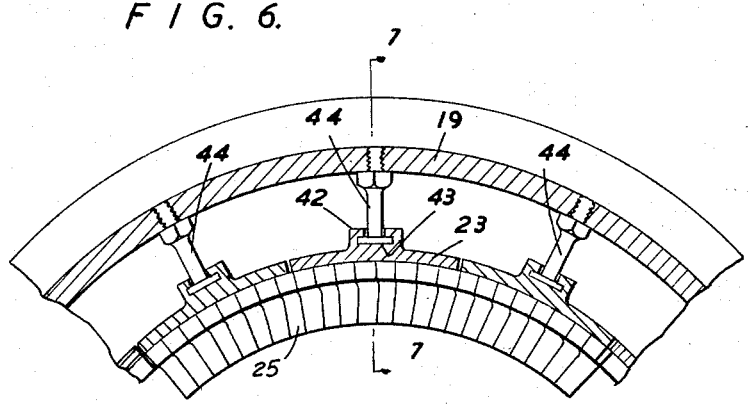
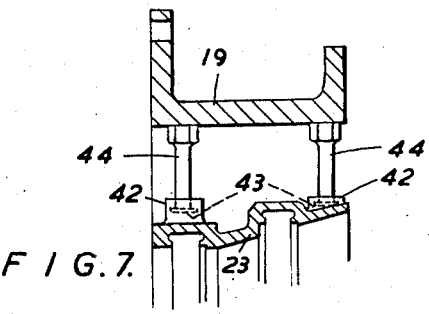
FIG. 7.
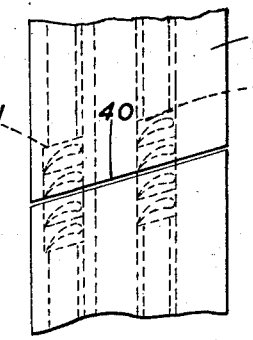
FIG 5
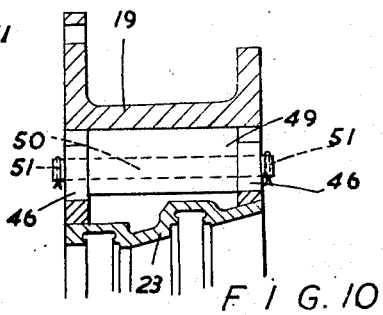
FIG. 10.
Inventor
G. B. R. FEILDEN
By Wilkinson + Mawhinney
Attorneys Patented May 19, 1953

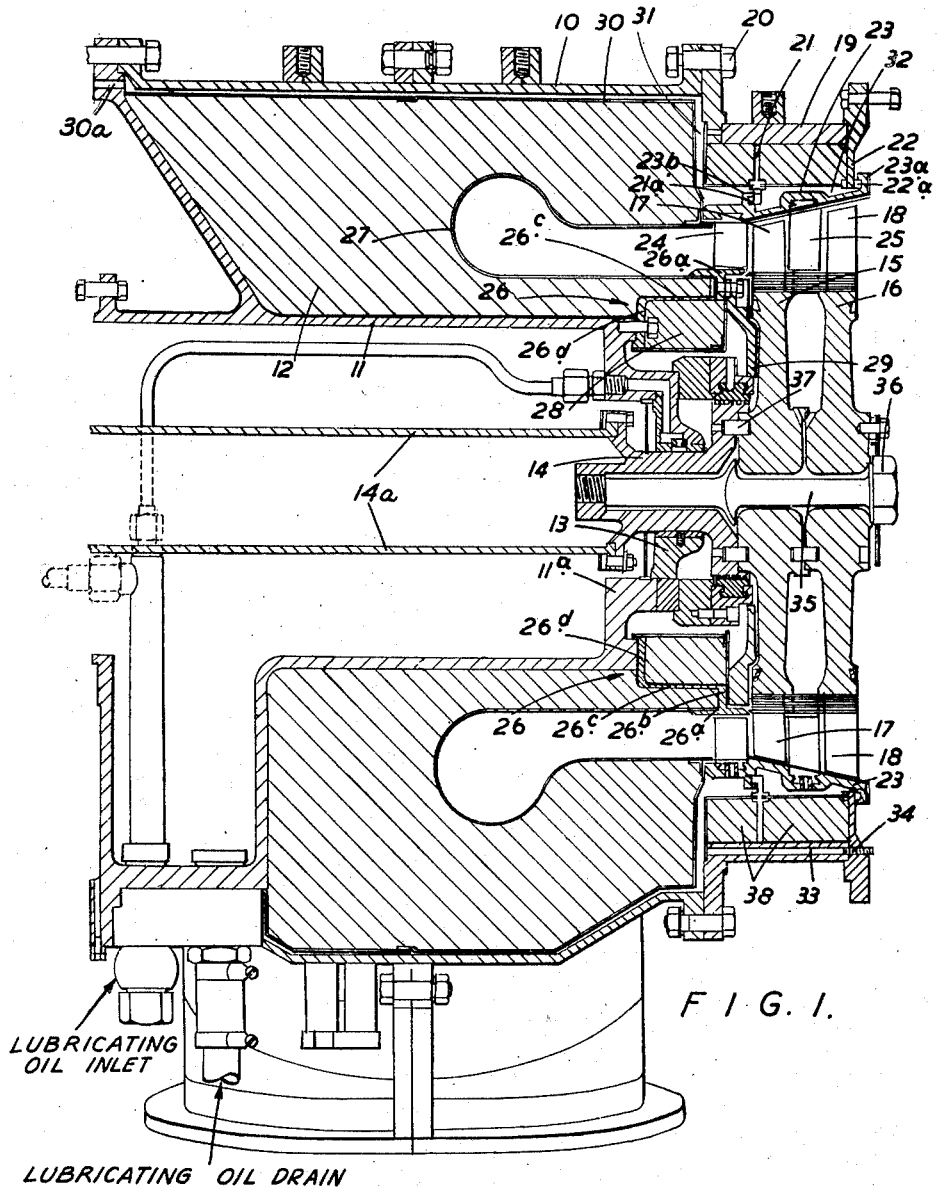
FIG. I.
LUBRICATING OIL INLET
LUBRICATING OIL DRAIN
Inventor
G. B. R. FEILDEN
By Wilkinson & Mawhinney
Attorneys

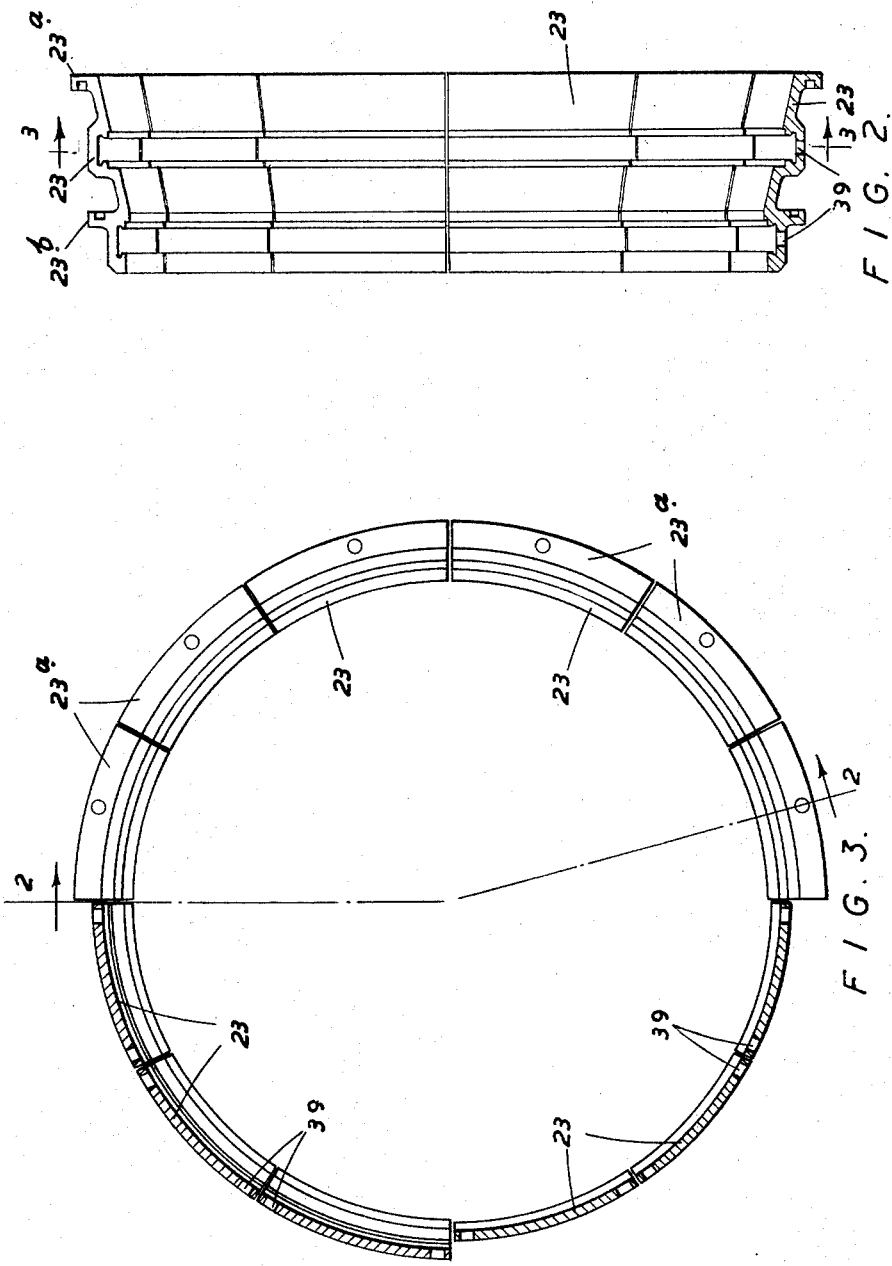

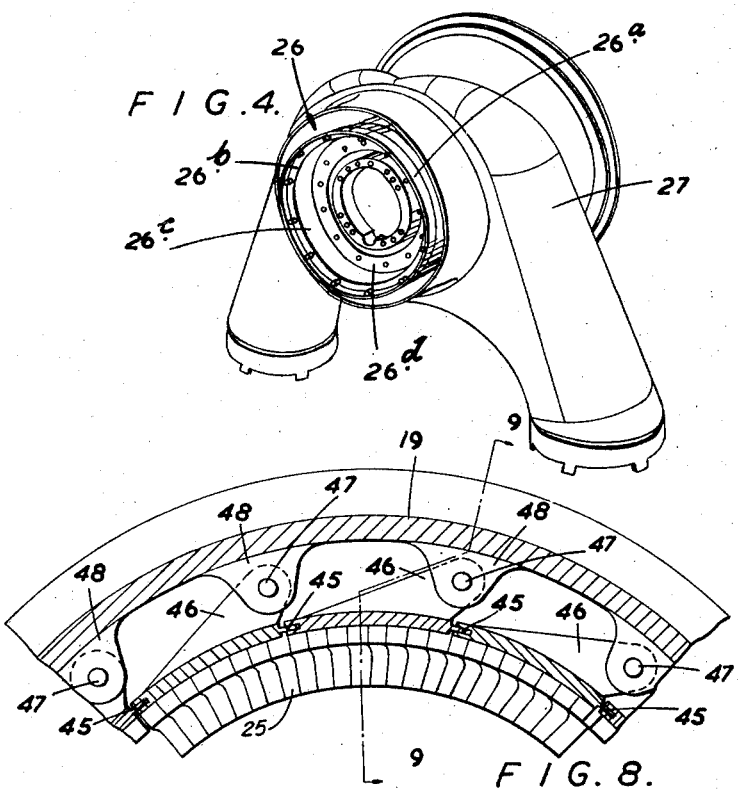
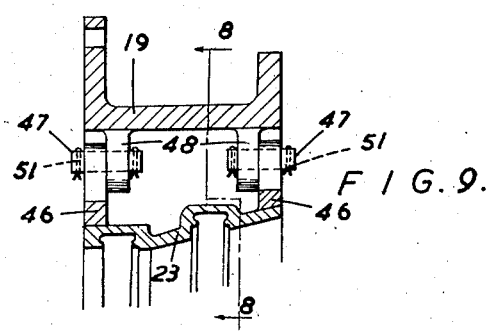

2,638,743

UNITED STATES PATENT OFFICE 2,638,743

CONSTRUCTION OF TURBINE-INLET AND STATOR ELEMENTS OF GAS TURBINES

Geoffrey Bertram Robert Feilden, Lincoln, England, assignor to Ruston & Hornsby Limited, Lincoln, England, a British company Application April 26, 1950, Serial No. 158,231
In Great Britain April 29, 1949

13 Claims. (Cl. 60—39.32)

This invention relates to gas turbines and more particularly to the mounting and cooling of the turbine stator assembly and the inlet volute carrying the heated air and combustion products to the turbine entry. The invention is more especially applicable to gas turbines operating at high temperatures, e. g., of the order of 1000° to 1200° K. at the entry of the first row of stator or nozzle blading.

An object of the improvements hereinafter described is to enable components which are subject to great changes of temperature to be made of very light section so as to minimise thermal stresses and allow of rapid starting and shut down of the plant.

With this object in view the stationary structural elements of a turbine assembly according to this invention comprise external and internal coaxial drum-like casing members supported and rigidly interconnected at their ends remote from the turbine only; and the stator assembly of the turbine is supported by the free end of the outer casing member, while the free end of the inner casing member, which may also carry a turbine-shaft bearing, supports the inlet volute, which is embedded in lagging supported on the outside of the inner casing member, a narrow annular space being left between the outer face of the lagging and the inner face of the outer casing member, through which space cooling air bled from the compressor is passed to maintain the outer casing member and stator assembly at a predetermined temperature, which may be controlled by varying the quantity of cooling air, or the heat transfer through the lagging.

In a preferred form of construction, the inlet volute is supported on an apertured diaphragm, being attached to a part thereof constituting the inner wall of the entry or nozzle annulus of the turbine and shrouding the tips of the first or nozzle row of stator blades, which are supported cantileverwise from an outer shroud-ring, and the apertured diaphragm is connected to the free end of the inner casing-member and includes an intermediate cylindrical portion of appreciable axial length and small wall-thickness.

In operation, the temperature of the part shrouding the stator-blade-tips and supporting the inlet volute is high and that of the inner casing is relatively low, so that the complete apertured diaphragm is subjected to a considerable temperature-gradient of which the differential expansion effects are accommodated by the cylindrical portion mentioned above, this member becoming slightly conical under operating conditions.

In accordance with known practice the stator assembly comprises an inner segmental shroud-ring in which the stator blades are mounted and from which they project inwardly, and an outer supporting ring or casing extension secured to the outer casing member and supporting the segments of the shroud-ring in a manner leaving them free to expand and contract circumferentially and axially.

The objects of the invention include various improvements in constructions of this type, as hereinafter described with reference to the accompanying drawings.

Another object of the invention is the provision of improved means for regulating the cooling of the stator shroud-ring and of the outer casing extension, to enable the clearances between the stator-shroud-ring and the tips of the turbine rotor blades to be correctly adjusted. This is accomplished by providing adjustable bleeds from the above-mentioned gap between the laggings by means of ducts drilled longitudinally through the outer casing extension and provided with adjustable restrictors, which may be in the form of screw-plugs having clearance threads, adjustment of the clearances being obtained by the use of interchangeable screw-plugs, whose thread-tips are truncated to different extents or whose lengths are different.

The inlet volute itself, whose walls are subjected to small pressure differences only, is preferably made of quite light gauge sheet metal, so as to minimise temperature stresses when the plant is started-up.

A specific embodiment of the invention and certain modifications thereof are illustrated by way of example in the accompanying drawings. The description which follows is without implied limitation of the scope of the invention as defined in the appended claims. In the drawings, Figure 1 is an axial section of a two-stage axial flow gas turbine;

Figure 2 is an axial section of the segmental stator ring of the turbine of Figure 1, taken on the line 2—2 of Figure 3;

Figure 3 is a half end elevation of the stator ring together with a half section on the line 3—3 of Figure 2;

Figure 4 is a perspective view of the inlet volute of the turbine of Figure 1;

Figure 5 is a broken plan view of part of a modified form of segmental stator ring;

Figure 6 is a broken sectional view in a plane perpendicular to the axis of rotation of part of a second modified form of segmental stator ring and its mounting;

Figure 7 is a view in section on the line 7—7 of Figure 6, omitting the blades;

Figure 8 is a view similar to Figure 6 illustrating another modification, the section being on the line 8—8 of Figure 9;

Figure 9 is a view in section on the line 9—9 of Figure 8, omitting the blades; and Figure 10 is a view similar to Figure 9 illustrating a further modification.

The turbine illustrated in Figures 1 to 4 comprises a barrel-shaped outer casing 10 and a concentric cylindrical inner casing 11, the annular space between which is occupied by lagging 12 carried on the inner casing 11. The casing 11 is connected to the outer casing 10 at the end remote from the turbine rotor, and at the other end, which is not connected to the outer casing, terminates in an apertured diaphragm 11ª to which is secured a bearing housing 13 carrying a bearing in which is supported a journal 14.

The turbine rotor comprises two discs 15, 16 secured to the journal 14 by a retaining stud 35 and nut 36 and keyed by dowels 37. Disc 15 carries a first stage row of rotor blades 17 and disc 16 carries a second stage row of rotor blades 18.

The outer casing 10 is extended by means of a cylindrical extension 19 secured to the casing 10 by a flange joint and bolts 20. Integral webs 21, 22 extend inwardly from the casing extension 19 in planes perpendicular to the axis of rotation and the webs 21, 22 terminate in axially extending circumferential flanges 21ª, 22ª which engage corresponding circumferential grooves formed in the faces of flanges 23ª, 23ᵇ formed integrally on a segmental stator ring 23 from which the flanges 23ª, 23ᵇ extend outwardly in planes perpendicular to the rotational axis. This method of mounting permits the stator ring to expand axially without straining the casing extension 19, and since in operation the stator ring becomes hotter than the tongues 21ª, 22ª the clearances in the grooves of the flanges 23ª, 23ᵇ tend to increase, thus eliminating any tendency to bind on the tongues. Similarly, the construction of the stator ring 23 in a number of segments (see Figures 2 and 3) separated by small initial clearances allows for circumferential expansion of the segments.

The stator ring carries a row of nozzle stator blades 24 and a row of interstage stator blades 25.

The inner wall of the nozzle annulus is constituted by a cylindrical portion 26ª of a member 26 which also comprises an annular plate portion 26ᵈ secured to the end of the inner casing 11; and the portion 26ª is joined to the portion 26ᵈ by a short inwardly extending web 26ᵇ and a relatively long cylindrical portion 26ᶜ of relatively small wall thickness.

When the turbine is running the portion 26ª becomes very hot relatively to the plate portion 26ᵈ and the differential expansion of these parts is accommodated by distortion of the relatively long cylindrical portion 26ᶜ without setting up unacceptable thermal stresses, the temperature gradient along the length of the portion 26ᶜ being such as to cause the portion 26ᶜ to distort in the required manner, i. e. so that its diameter at the end next the portion 26ᵇ exceeds that at the end next the portion 26ᵈ, and owing to the length of the portion 26ᶜ the temperature gradient is not too steep.

The turbine includes an inlet volute 27, whose shape is best shown in Figure 4.

The inlet volute is preferably of light gauge sheet metal to minimize thermal stresses when starting up the turbine, the pressure difference to which its walls are subjected being relatively small. The inner wall of the nozzle opening of the inlet volute is attached to the portion 26ª of the member 26 and the volute is supported by this attachment. The outer wall of the inlet volute nozzle opening is unsupported and is in register with the inner end of the segmental stator ring 23. The inlet volute is embedded in the lagging 12.

A ring of lagging 28 enclosed in the cylindrical portion 26ᶜ of the member 26 shields the bearing housing 13 and the journal 14 from radiation and conduction of heat from the hot elements 26ᵇ and 26ᶜ and an apertured plate 29 secured to the portion 26ᵇ of member 26 shrouds the first stage turbine disc 15.

The stator ring 23 is cooled by air which circulates in a space 32 between the stator ring and lagging 38 enclosed in the casing extension 19 and embedding the web 21, the air being admitted through an opening 30ª into a clearance 30 between the outer casing 10 and the lagging 12 and thence into a clearance 31 between the laggings 12 and 38 communicating with space 32. The cooling air escapes into the turbine annulus through the openings 39 in the segments of ring 23. The cooling air is supplied under pressure from any convenient external source to opening 30ª. In practice it is usually bled from the last stage of the compressor (not illustrated) which supplies the air for combustion to generate the working fluid of the turbine and may be driven by shaft 14ª connected to journal 14.

Part of the air circulating in clearance 31 can enter ducts 33 drilled in the casing extension 19. The outer ends of these ducts are filled by tapered screw plugs 34 having clearance threads, and the amount of air which can escape past the plugs can be regulated by providing interchangeable plugs whose thread tips are truncated to different extents or whose lengths are different.

The partings between the segments of the stator ring 23 may be obliquely inclined to the rotational axis as shown at 40 in Figure 5. This is convenient when the blade platforms 41 have inclined edges as shown, the separating planes being inclined at the same angle on the edges of the platforms.

In a modified form of construction illustrated in Figures 6 and 7, each stator ring segment 23 has an external longitudinal rib 42 which is provided with a longitudinal laterally recessed slot to receive the heads 43 of T-bolts 44 secured in the outer casing extension 19.

In another modification, illustrated in Figures 8 and 9, the segments 23 have tongue and groove joints 45 and are provided with external lugs 46 by which they are suspended on pins 47 mounted in lugs 48 extending inwardly from the outer casing extension 19, the axes of the pins 47 being parallel to the rotational axis.

Figure 10 illustrates an alternative form of this construction in which the paired lugs 48 of Figure 9 are replaced by a single lug 49 extending the full width (less necessary clearances) of the space between the two lugs 46 of member 23, a single pin 50 being substituted for the two pins 47 of Figure 9. The pins 47 (of Figures 8 and 9) and 50 (of Figure 10) are secured by split pins 51.

The forms of construction illustrated in Figures 6 to 10 allow unrestricted axial expansion of the stator ring segments 23 in the same way as the mounting of the stator ring segments illustrated in Figures 1 to 3; and in all the forms

I claim:

1. In an axial flow gas turbine, a turbine rotor, an outer drum-like casing having an extension surrounding the rotor, an inner drum-like casing coaxial with and radially spaced from the outer casing and connected thereto at the end remote from the rotor, an inlet volute of sheet metal terminating in an annular opening, an inlet-volute-supporting member comprising as integral parts thereof an annular plate attached to the end of the inner casing member next the rotor, an intermediate thin-walled cylindrical portion extending towards the rotor, an annular web, and a further cylindrical portion, all arranged in the order named and said last-named cylindrical portion defining the inner boundary of the entry of the turbine and having attached thereto the inner wall of the opening of said inlet volute, a segmental shroud ring coaxially disposed within and radially spaced from the outer casing extension, the segments of said shroud ring being supported by the outer casing extension with freedom to expand axially and circumferentially, and one end of the segmental shroud ring defining the outer boundary of the entry of the turbine being in register with but unconnected to the outer wall of the opening of the inlet volute, stator blading mounted in the segmental shroud ring, and rotor blading mounted on the rotor.

2. A construction as claimed in claim 1, including lagging applied to the outside of the inner drum-like casing, an annular air passage being provided between the lagging and the outer drum-like casing.

3. A construction as claimed in claim 1, including lagging applied to the outside of the inner drum-like casing, the inlet volute being embedded in the lagging.

4. A construction as claimed in claim 3, including lagging applied to the inside of the outer casing extension, an annular air space between the last-named lagging and the segmental shroud ring, and an air passage between the mutually adjacent end faces of the last-named lagging and the lagging mentioned in claim 3, said last-named air passage connecting the said annular air space with the annular air passage mentioned in claim 3, and the segmental shroud ring being provided with openings for escape of air from the annular air space.

5. A construction as claimed in claim 1, including lagging applied to the inner face of the cylindrical portion of the apertured diaphragm.

6. A construction as claimed in claim 1, including a bearing housing mounted on the end of the inner casing next the rotor and a journal member rotatably supported in the bearing housing, the rotor being secured to the journal member.

7. In an axial flow gas turbine, a rotor, an outer drum-like casing having an extension surrounding the rotor, an inner drum-like casing coaxial with and radially spaced from the outer casing and connected thereto at the end remote from the turbine, lagging applied to the outside of the inner casing, an inlet volute embedded in the lagging and having an annular discharge opening, inlet-volute supporting member secured to the inner casing, an annular air passage between the lagging and the outer casing, a segmental shroud ring coaxial within and radially spaced from the outer casing extension and supported by the outer casing extension and having air escape openings therein, an air passage connecting the first named air passage with the space between the outer casing extension and the segmental shroud ring, stator blading mounted in the segmental shroud ring and rotor blading mounted on the rotor, the inner edge of the segmental shroud ring being in register with the outer boundary of the discharge opening of the inlet volute but unconnected thereto.

8. A construction as claimed in claim 7, including ducts formed in the thickness of the outer casing extension and communicating with the air passages mentioned in claim 7, said ducts terminating in external openings, and restrictors in said openings.

9. A construction as claimed in claim 8, in which the restrictors consist of threaded plugs with clearance threads, said plugs being interchangeable with others of differing lengths and having threads truncated to differing extents, for selectably varying the amount of air that can escape past them and thereby regulating the cooling of the segmental shroud ring.

10. In an axial flow gas turbine, an outer stator casing, a shroud ring coaxially located within and radially spaced from said outer stator casing, stator blading mounted in said shroud ring, T-headed bolts secured in and extending inwards from said outer stator casing, said shroud ring being composed of separate segments each of which has a longitudinal rib on its outer face, said rib having a laterally recessed longitudinal slot receiving the T-heads of said bolts, whereby the shroud ring segments are supported with freedom for longitudinal and circumferential expansion.

11. In an axial flow gas turbine, an outer stator casing, a shroud ring coaxially located within and radially spaced from said outer stator casing, stator blading mounted in said shroud ring, said shroud ring being composed of separate segments each of which is hingedly suspended from the outer stator casing about an axis parallel to the rotational axis, neighbouring segments being mutually located with freedom to expand circumferentially by means of tongue and groove joints.

12. A construction as claimed in claim 11, including apertured integral lugs extending inwards from the outer stator casing, a pair of integral apertured lugs extending outwards from each shroud ring segment and hinge pins interconnecting the shroud ring lugs with the outer stator casing lugs.

13. In an axial flow gas-turbine, a construction which comprises an outer and an inner drum-like casing, said casings being substantially coaxial and radially separated and mutually interconnected at one end only, a shroud ring and stator blading mounted therein, the free end of the outer casing being extended to constitute an external coaxial support for the shroud ring, an inlet volute having an annular discharge opening, and an inlet-volute supporting member mounted by its inner margin on the free end of the inner casing and including as integral parts thereof a cylindrical portion constituting the inner wall of the turbine entry annulus, an annular web and an intermediate cylindrical portion of considerable length relatively to its wall-thickness, the inlet volute being attached by the inner margin of its discharge opening to said first-named cylindrical portion and the outer margin of said discharge opening being in register with but unconnected to the adjacent marginal part of the shroud ring, which marginal part constitutes the outer wall of the turbine entry annulus.

GEOFFREY BERTRAM ROBERT FEILDEN.

References Cited in the file of this patent

UNITED STATES PATENTS

| Number | Name | Date |
|---|---|---|
| 2,241,782 | Jendrassik | May 13, 1941 |
| 2,414,788 | Altorfer | Jan. 28, 1947 |
| 2,417,486 | Hagemann | Mar. 18, 1947 |
| 2,427,244 | Warner | Sept. 9, 1947 |
| 2,445,661 | Constant et al. | July 20, 1948 |
| 2,472,062 | Boestad et al. | June 7, 1949 |
| 2,584,899 | McLeod | Feb. 5, 1952 |
| 2,591,399 | Buckland et al. | Apr. 1, 1952 |
| 2,599,470 | Meyer | June 3, 1952 |

FOREIGN PATENTS

| Number | Country | Date |
|---|---|---|
| 609,682 | Great Britain | Oct. 5, 1948 |